(12) United States Patent
Daggett

(10) Patent No.: US 6,834,831 B2
(45) Date of Patent: Dec. 28, 2004

(54) HYBRID SOLID OXIDE FUEL CELL AIRCRAFT AUXILIARY POWER UNIT

(75) Inventor: David Daggett, Snohomish, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/334,480

(22) Filed: Dec. 31, 2002

(65) Prior Publication Data
US 2004/0124308 A1 Jul. 1, 2004

(51) Int. Cl.[7] .............................................. B64D 33/00
(52) U.S. Cl. ........................ 244/58; 244/118.5; 429/12; 429/20
(58) Field of Search ................................ 244/53 R, 58, 244/59, 60, 61, 118.5; 60/39.07; 429/16, 19, 20, 26, 30, 31; 204/241, 269

(56) References Cited

U.S. PATENT DOCUMENTS

| | | | | |
|---|---|---|---|---|
| 4,091,613 A | * | 5/1978 | Young | 60/39.07 |
| 5,413,879 A | * | 5/1995 | Domeracki et al. | 429/30 |
| 5,967,461 A | * | 10/1999 | Farrington | 244/118.5 |
| 6,296,957 B1 | * | 10/2001 | Graage | 244/58 |
| 6,450,447 B1 | * | 9/2002 | Konrad et al. | 244/53 R |
| 2001/0049035 A1 | | 12/2001 | Haltiner, Jr. et al. | |
| 2002/0100836 A1 | * | 8/2002 | Hunt | 244/50 |
| 2002/0114985 A1 | * | 8/2002 | Shkolnik et al. | 429/20 |

* cited by examiner

*Primary Examiner*—Galen Barefoot
(74) *Attorney, Agent, or Firm*—Black Lowe & Graham PLLC; Dale C. Barr

(57) ABSTRACT

An apparatus and method for improving the efficiency and energy output of a power unit are disclosed. The power unit employs a fuel cell configured to chemically convert combustible fuel into electrical energy. A waste fuel burner is configured to receive uncombusted fuel emitted by the fuel cell, and the waste burner combusts the uncombusted fuel to generate heated gas. A turbine is configured to receive and be driven by the heated gas. The turbine is further configured to drive a drive shaft which is coupled to a compressor. The compressor is configured to compress a pressurized source of oxidizing gas for supplying compressed oxidizing gas to the fuel cell such that efficiency of the fuel cell is improved. A generator also may be coupled to the drive shaft, and the generator is configured to generate electrical power from the drive shaft being turned by the turbine.

31 Claims, 4 Drawing Sheets

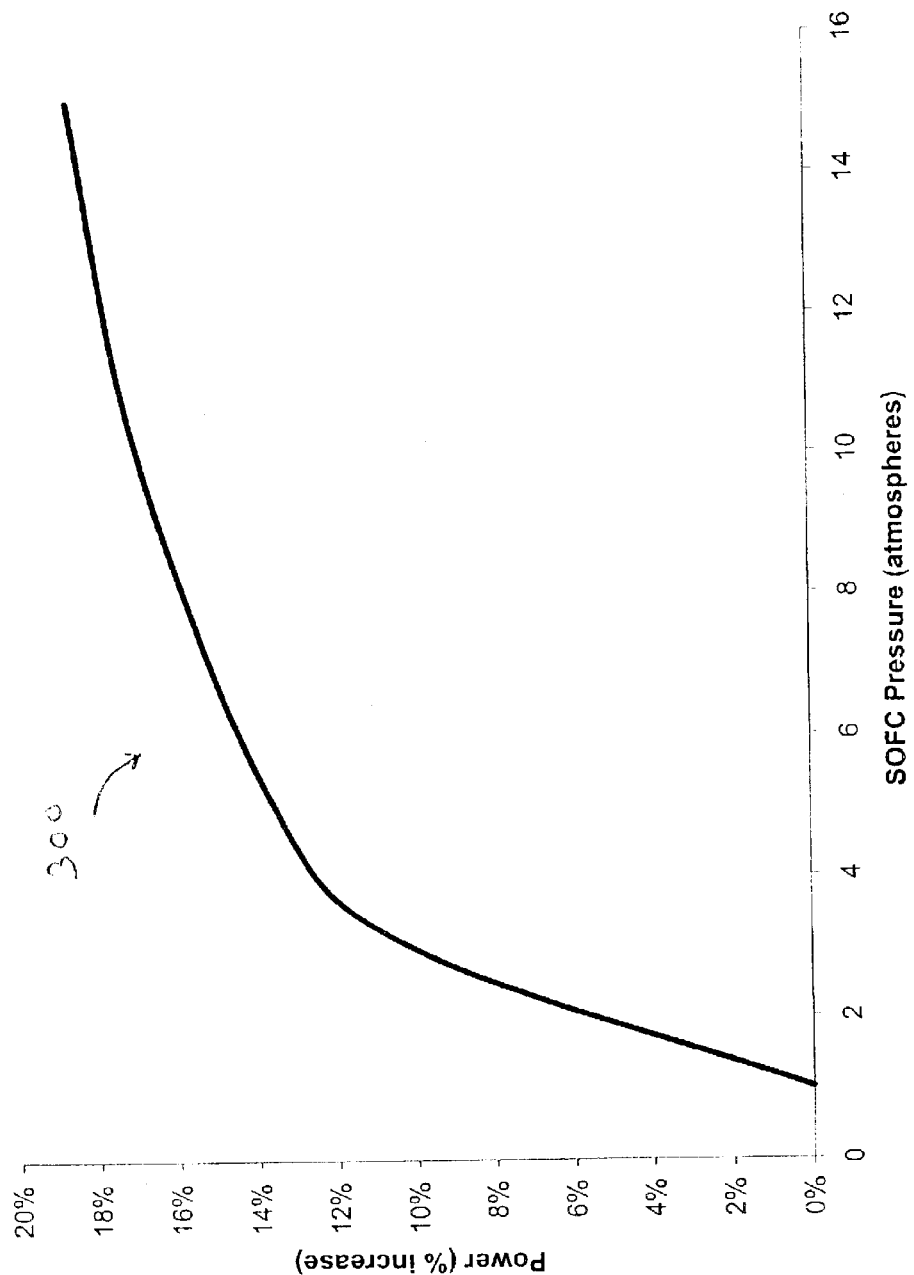

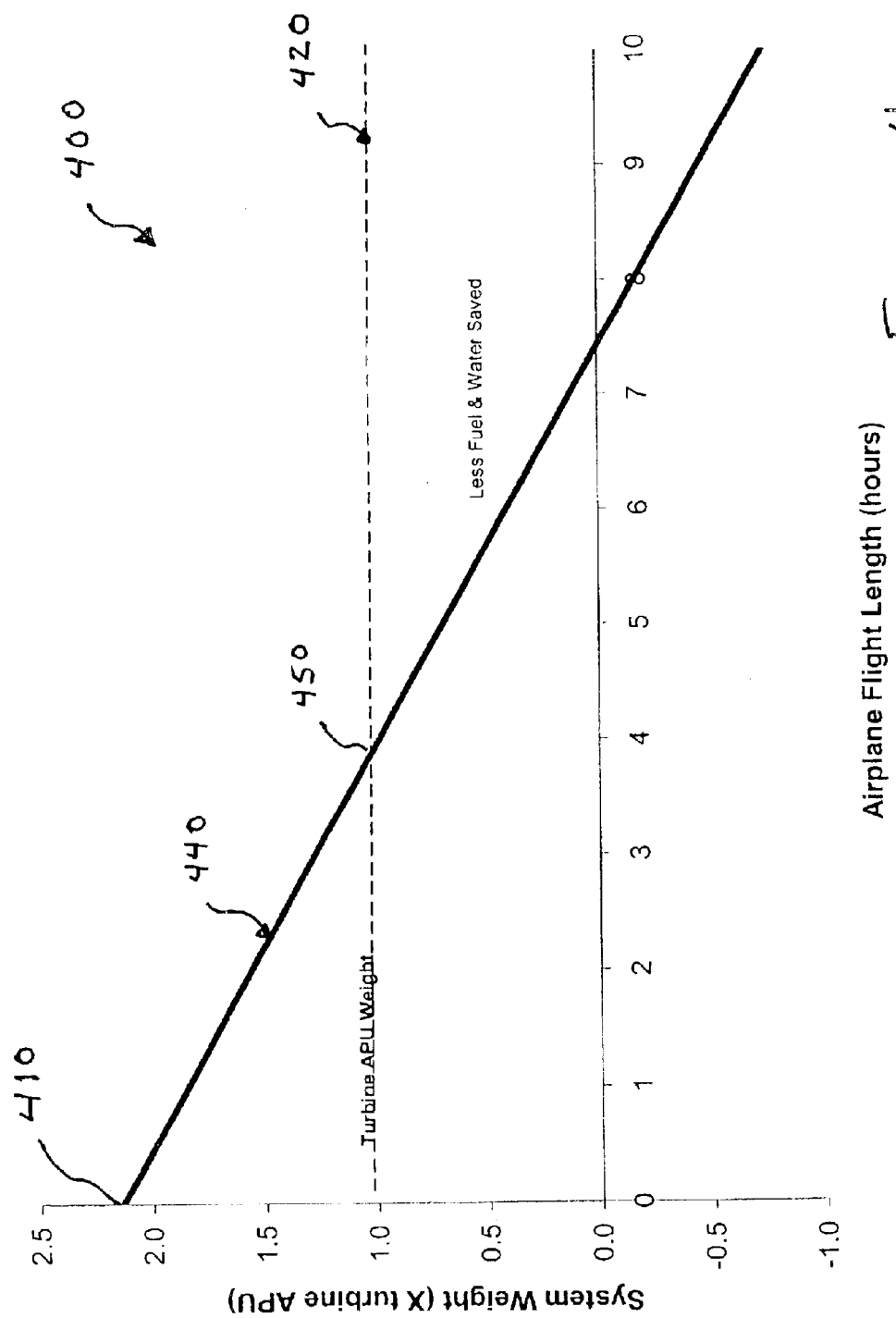

HYBRID SOLID OXIDE FUEL CELL AIRCRAFT AUXILIARY POWER UNIT

FIELD OF THE INVENTION

This invention relates generally to aircraft electrical power supplies and, more specifically, to providing a more efficient source of electrical power for aircraft.

BACKGROUND OF THE INVENTION

As is understood in the art, aircraft may use two types of auxiliary power units (APUs)—turbine-driven APUs and fuel cell APUs—to provide electricity to onboard systems. Turbine-driven APUs burn jet fuel to drive a turbine, which in turn drives a generator to produce electrical energy. Fuel cells chemically convert fuel into electrical energy. Both types of APUs may be used to power onboard systems while the aircraft is on the ground, as well as when the aircraft is in flight.

As useful as both types of APUs may be, however, each has disadvantages. Turbine-driven APUs may contribute appreciable pollution to an airport environment, because the burning of fuel to drive the turbines leaves some jet fuel uncombusted and produces oxides of nitrogen ($NO_X$). Fuel cell APUs, on the other hand, offer lower emissions than turbine-driven APUs, but tend not to be efficient at high altitudes. In turbine-powered systems and fuel cels, attempts are made to exploit waste heat generated from the burning of combusted fuel by turbine-driven APUs or exothermically produced by fuel cell APUs to heat buildings or water for ground facilities.

In both cases, aircraft or other systems could benefit from improved APUs. More efficient fuel cell APUs, particularly at higher altitudes, would reduce the demand for other sources of electrical power.

Thus, there is an unmet need in the art for an improved APU and power generation method to cost-effectively provide sufficient electrical power while generating less pollution and consuming less fuel than current systems.

SUMMARY OF THE INVENTION

The present invention provides an apparatus and a method for improving the efficiency and energy output of a power unit. The present invention improves efficiency of a chemical process for converting combustible fuel into electrical energy by providing a supply of compressed air to the process. Combustible fuel not consumed by the chemical process is collected and burned to drive a turbine which, in turn, drives a compressor to supply the compressed air. In addition, an electrical generator can be coupled to the turbine to produce additional electrical energy. A starter motor also may be coupled with the compressor to compress air during a starting process.

An exemplary embodiment of the present invention is a power unit in which a fuel cell is configured to chemically convert combustible fuel into electrical energy. A waste fuel burner is configured to receive uncombusted fuel emitted by the fuel cell, and the waste burner combusts the uncombusted fuel to generate heated gas. A turbine is configured to receive and be driven by the heated gas. The turbine is further configured to drive a drive shaft which is coupled to a compressor. The compressor is configured to compress a pressurized source of oxidizing gas for supplying compressed oxidizing gas to the fuel cell such that efficiency of the fuel cell is improved.

The present invention may also incorporate a fuel reformer which can extract reactants from waste heat produced by the fuel cell. The present invention also may supply water to the reformer to facilitate the extraction of reactants. If desired, the water may be supplied by a water separator which extracts water from the heated gas. Water not used by the reformer may provide a water source for other purposes.

A form of the present invention may be used as an aircraft auxiliary power unit. The power unit suitably compresses air to provide a pressurized input gas to the fuel cell to enhance production of electrical power.

BRIEF DESCRIPTION OF THE DRAWINGS

The preferred and alternative embodiments of the present invention are described in detail below with reference to the following drawings.

FIG. 3 is graph plotting increasing power performance versus atmospheric pressure attending a fuel cell; and FIG. 4 is a graph plotting total mass and effective total mass versus cruise time for auxiliary power units.

DETAILED DESCRIPTION OF THE INVENTION

Figure 1:
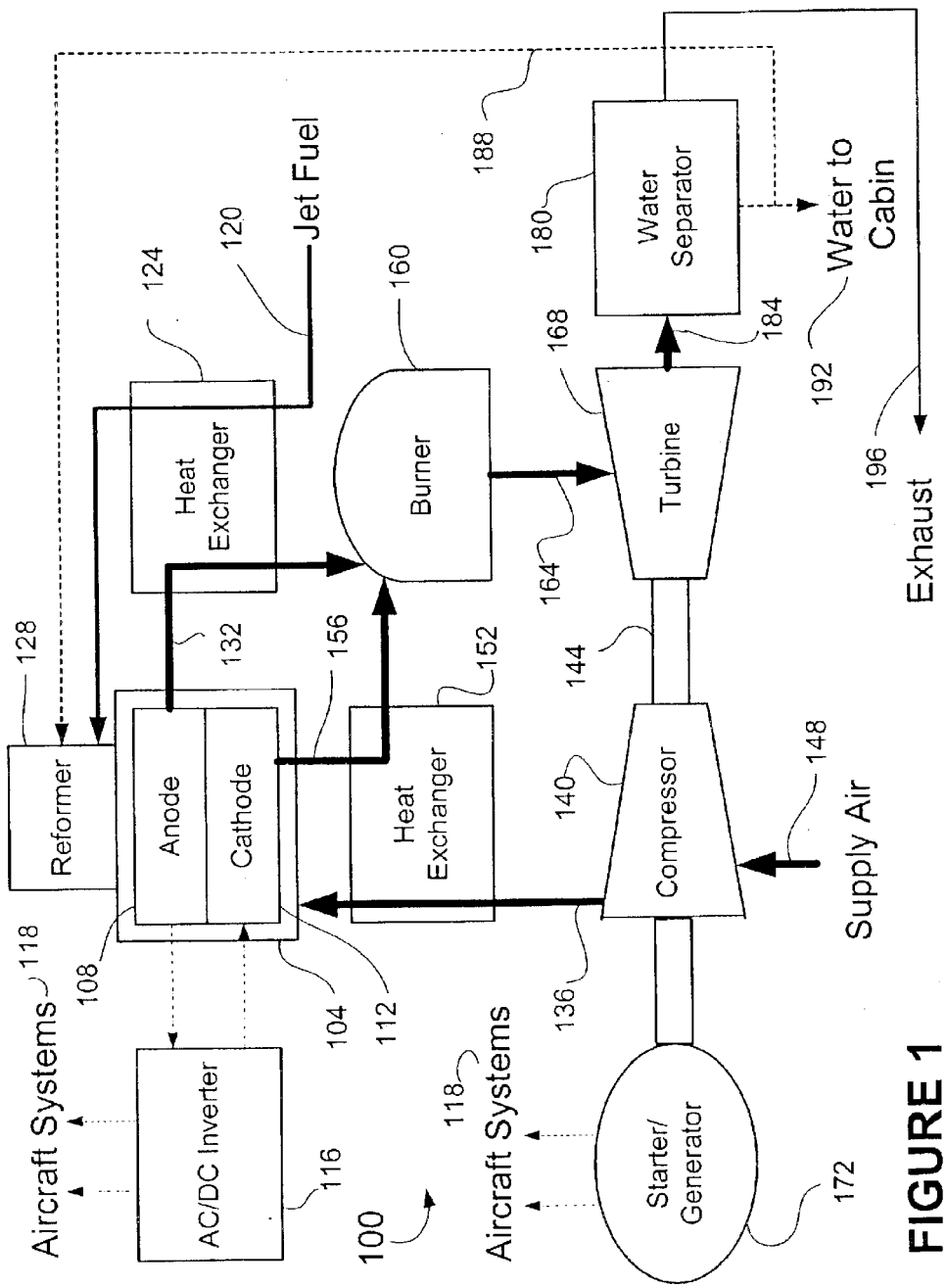
FIG. 1 is a block diagram of a hybrid solid oxide fuel cell auxiliary power unit using an embodiment of the present invention.

FIG. 1 is a block diagram of one exemplary embodiment of a hybrid fuel cell/turbine driven auxiliary power unit (APU) 100 of the present invention. A fuel cell 104 has an anode portion 108 and a cathode portion 112 which together provide direct current (DC) power. The DC power provided can, in turn, be supplied to an inverter 116 to provide alternating current (AC) power to electrical systems 118. Thus, both DC and AC power are provided by an embodiment of the present invention. In one presently preferred embodiment, the fuel cell is a solid oxide fuel cell (SOFC). Although the exemplary embodiment herein described refers to an aircraft application, embodiments of the present invention also could be used in other transportation systems, such as ships, tanks, military vehicles, trains, and others. Embodiments of the present invention also could be used for ground-based power generating applications.

The fuel cell 104 receives a supply of jet fuel 120. The jet fuel supply 120 is routed through a heat exchanger 124 and a reformer 128. The heat exchanger 124 receives hot exhaust 132 generated by the anode portion 108 of the fuel cell 104 or the fuel cell stack (not shown) itself, and that heat is applied to the jet fuel supply 120 to increase the temperature of the jet fuel supply 120 to expedite the chemical processes of the reformer 128. The reformer 128 reforms the now-heated, albeit heated below a coking point, jet fuel supply 120 into hydrogen and carbon monoxide to be used by the fuel cell 104. The reformer may be a steam reformer, a catalytic partial oxidation reformer, an autothermal reformer, or another similar type of reforming apparatus which can convert fuel into the hydrogen and carbon monoxide reactants used by the fuel cell 104.

The fuel cell 104 also receives a supply of input gas 136 which, in embodiments of the present invention, is a pressurized supply. In one presently preferred embodiment, a compressor 140, driven by a drive shaft 144 through a process which will be further described below, compresses the input gas supply to provide a denser and more component-rich input gas supply to the fuel cell 104. As previously mentioned, currently conceived fuel cells are inefficient at high altitudes. This inefficiency owes in part to low atmospheric pressure. Pressurizing the supply of input gas 136 improves efficiency of the chemical reactions in the fuel cell 104.

In the embodiment shown in FIG. 1, a raw gas input supply suitably can be aircraft cabin air 148. Using aircraft cabin air 148 that is already pressurized increases, for example, the pressure of input gas to the fuel cell from a pressure of about 3.5 pounds per square inch (PSI) at a typical commercial airline cruising altitude of about 35,000 feet to about 10.9 PSI or more, that is a typical cabin pressure. Moreover, further compressing the gas using the compressor 140 can compress the aircraft cabin air 148 around another 2.5 to 5.0 times, further expediting the chemical processes of the fuel cell 104.

Using aircraft cabin air 148 has another advantage in that it is relatively rich in water vapor, and water is used in the chemical conversion made by the reformer 128. By advantageously using the aircraft cabin air 148 which is richer in water vapor than high-altitude atmospheric air and compressing it further, the dense, rich input gas supply 136 makes the fuel cell 104 even more efficient.

As shown in FIG. 1, the compressed input gas supply 136 is also passed through a heat exchanger 152 which is warmed by hot exhaust 156 produced by the cathode portion 112 of the fuel cell 104 or can be warmed by the heat lost from the fuel cell stack (not shown) itself. Increasing the temperature of the input gas supply 136, as will be appreciated by one ordinarily skilled in the art, further enhances the chemical processes performed by the fuel cell 104 and reduces thermal gradients to the fuel cell stack (not shown).

As shown in FIG. 1, the exhaust 132 generated by the anode portion 108 of the fuel cell 104 and the exhaust 156 produced by the cathode portion 112 of the fuel cell are collected and combusted in a burner 160. The exhaust 132 of the anode portion 108 contains uncombusted jet fuel which was not converted by the chemical reactions within the fuel cell 104. In one presently preferred embodiment of the present invention, capturing and combusting this uncombusted jet fuel in the burner 160 results in a pressurized heated gas stream 164 which can forcibly drive a turbine 168. The turbine 168 is coupled to the drive shaft 144, driving that drive shaft 144 so that it can impart the mechanically converted energy for other uses. One such use, as previously described, is turning the compressor 140 to pressurize the input gas supply 136 to the fuel cell 104.

In a presently preferred embodiment of the present invention, another use of the mechanical energy produced by the turbine 168 and imparted to the drive shaft 144 is the turning of a starter/generator 172 which is also coupled to the drive shaft 144. As part of its generator function, the starter generator 172 converts the mechanical energy manifested in rotation of the drive shaft into electric power, providing another source of electricity for aircraft systems. As shown in FIG. 1, all of the DC output of the fuel cell 104 is shown as being supplied to the inverter 116 to provide AC current to the aircraft systems 118, and the inherently AC output of the starter/generator 172 is also shown as being provided directly to aircraft systems 118. However, as will be appreciated by one ordinarily skilled in the art, electric power output by the fuel cell 104 and/or the starter generator 172 can be divided, directed, and/or converted as needed to provide quantities of AC and DC electric power as desired for various aircraft systems.

Another function of the starter/generator 172 in a presently preferred embodiment of the invention is as a starter. When the burner 168 is not burning collected uncombusted jet fuel, there is no heated gas stream 164 to drive the turbine 168 to drive the drive shaft 144 to turn the compressor 140. Because a pressurized input gas supply 136 will enhance functioning of the fuel cell 104, the starter/generator 172 can be supplied with a source of electricity (not shown) to drive the drive shaft 144 to which it is coupled and, thus, turn the compressor 140 to create a pressurized input gas supply 136.

Another aspect of a presently preferred embodiment of the present invention is a water separator 180. The water separator 180 receives a turbine exhaust flow 184 which will be moisture rich from the burning of the jet fuel in the burner 160. The water separator 180 extracts a supply of collected water 188 from the turbine exhaust flow 184. The collected water supply 188 extracted by the water separator 180 can be used in the aircraft routed to the reformer 128 to enhance the production of reactants for the fuel cell, as will be understood by one ordinarily skilled in the art. An exhaust 196 composed of effluent from the fuel cell 104 and/or water and water vapor not extracted by the water separator 180 can be released as exhaust.

Figure 2:
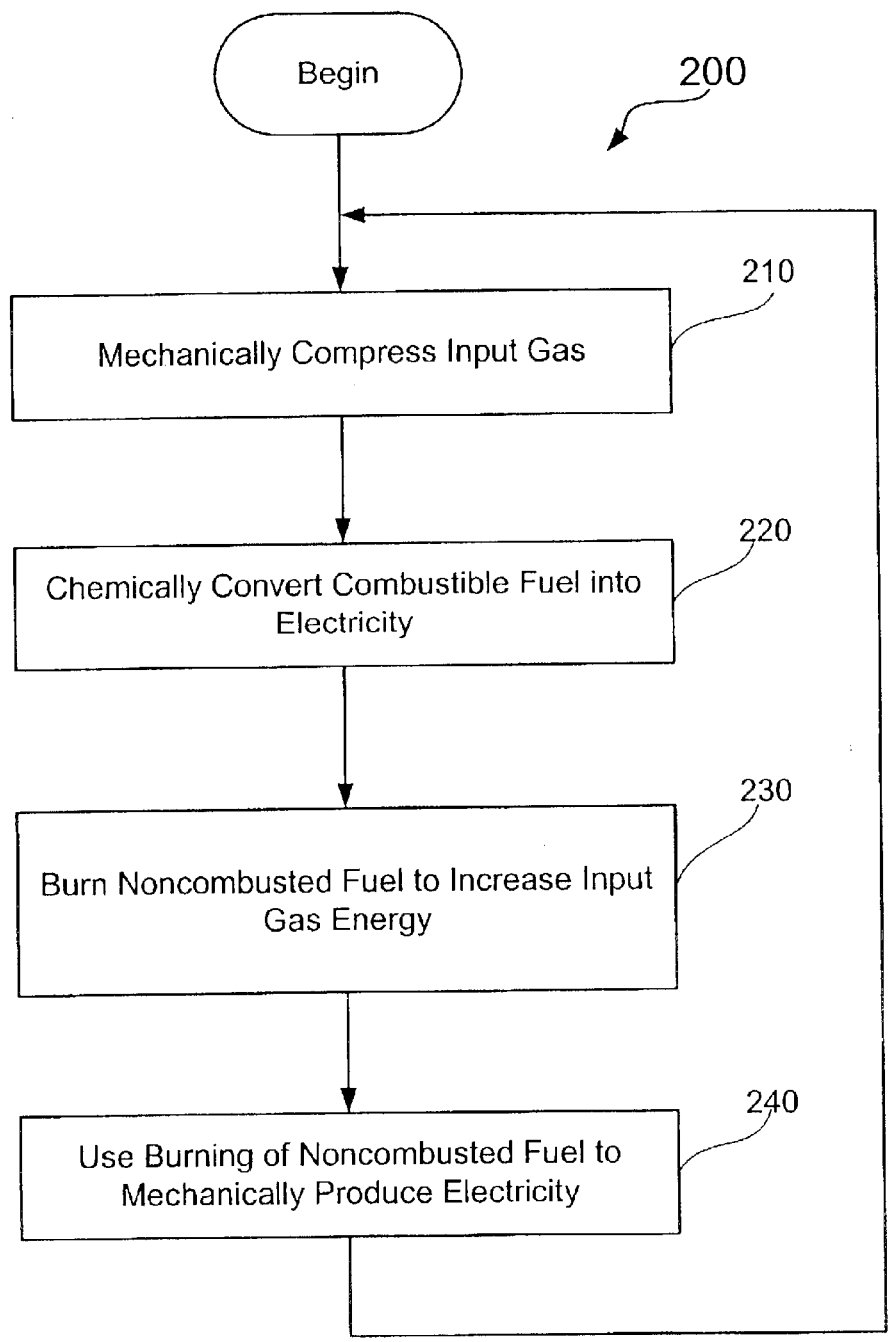
FIG. 2 is a flowchart of a method using an embodiment of the present invention to produce auxiliary power.

FIG. 2 is a flowchart illustrating a method 200 for producing electrical power using a combination of fuel cell and turbine-driven power generation. At a block 210, input gas to be used for the fuel cell reaction is mechanically compressed to make the input gas more dense and rich in input gas components used by the fuel cell. As previously described, gas input to this step may be an already pressurized source of gas, such as pressurized cabin air. Also as previously described, a starter/generator 172 (FIG. 1) might be used to turn a compressor 140 to compress input gas when no other source of mechanical energy is available for that process. At a block 220 (FIG. 2), combustible fuel is chemically converted into electricity, as might be performed by a fuel cell. At a block 230, fuel not combusted in the chemical conversion step at the block 220 is then combusted to increase energy content of input gas. At a block 240, in a presently preferred embodiment, mechanical energy produced by the combustion of uncombusted fuel also is used to mechanically produce electricity, such as by driving a starter/generator 172 (FIG. 1) as previously described. This process may repeat as desired.

FIG. 3 is a graph 300 showing effects of atmospheric pressure on fuel cell performance by plotting percentage power increase on a Y-axis versus fuel cell pressure on an X-axis. As can be seen from the graph 300, increasing pressure supplied to the fuel cell increases power output, particularly in a range from approximately one to three atmospheres. Accordingly, because an embodiment of the present invention increases fuel cell pressure by 2.5 to 5.0 times ambient pressure, embodiments of the present invention improve power production of the fuel cell.

FIG. 4 is a graph 400 plotting total mass and effective total mass versus airplane cruise time. A standing weight of a standard turbine-powered APU 420 and an embodiment of the present invention 410 are plotted, along with an effective total mass of an embodiment of the present invention 440. Advantageously, the effective total mass for the fuel cell APU decreases with cruise time because of the fuel saved and the water created as a result of the fuel cell processes. According to one embodiment of the present invention, the effective total mass 440 drops more sharply because of its greater efficiency and, at a point after about four hours of cruise time 450, the effective total mass 440 of the embodiment of the present invention becomes less than that of the turbine-powered APU 420. This improvement in effective total mass does not take into account the reduced pollution previously described.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A power unit comprising:
   a fuel cell configured to convert combustible fuel into electrical energy;
   a waste fuel burner configured to receive uncombusted fuel emitted by the fuel cell and combusting the uncombusted fuel to generate heated gas;
   a turbine configured to receive the heated gas and be driven by the heated gas, the turbine being further configured to drive a drive shaft;
   a compressor coupled to the drive shaft, the compressor being configured to further compress a pressurized source of oxidizing gas for supplying compressed oxidizing gas to the fuel cell; and
   a generator coupled to the drive shaft, the generator being configured such that the driving of the drive shaft by the turbine generates electrical energy, wherein the pressurized source of oxidizing gas is enriched with water vapor and includes cabin air from a pressurized aircraft.

2. The apparatus of claim 1, wherein the fuel cell includes a solid oxide fuel cell and the combustible fuel includes jet fuel.

3. The apparatus of claim 1, further comprising a reformer configured to receive waste heat emitted by the fuel cell and the combustible fuel, the reformer being further configured to assist in converting the combustible fuel into reactants used by the fuel cell.

4. The apparatus of claim 3, wherein the reformer is one of a steam reformer, a catalytic partial oxidation reformer, or an autothermal reformer.

5. The apparatus of claim 3, further comprising a water source configured to supply water to the reformer, the reformer using water from the water source to convert the combustible fuel into the reactants.

6. The apparatus of claim 3, wherein the water source includes a water separator coupled to receive exhaust gas from the turbine, the water separator being configured to extract water from the exhaust gas received from the turbine.

7. The apparatus of claim 6, wherein water produced by the water separator is used by other than the reformer.

8. The apparatus of claim 3, wherein the reactants converted from the combustible fuel by the reformer include hydrogen and carbon monoxide.

9. The apparatus of claim 1, further comprising at least one heat exchanger configured to receive waste heat generated by the fuel cell and return that waste heat to the fuel cell to enhance chemical reactions taking place therein and reduce thermal gradients taking place across a fuel cell stack.

10. The apparatus of claim 1, wherein the generator further comprises a starter coupled with the drive shaft, the starter being configured such that the starter drives the compressor when the turbine is not driving the drive shaft.

11. An aircraft auxiliary power unit comprising:
    a fuel cell configured to convert jet fuel into electrical energy;
    a waste fuel burner configured to receive uncombusted fuel emitted by the fuel cell and combusting the uncombusted fuel to generate heated gas;
    a turbine configured to receive the heated gas and be driven by the heated gas, the turbine being further configured to drive a drive shaft;
    a compressor coupled to the drive shaft being configured to further compress pressurized aircraft cabin air received at a compressor input for supplying compressed pressurized aircraft cabin air to the fuel cell; and
    a generator coupled to the drive shaft, the generator being configured such that the driving of the drive shaft by the turbine generates electrical energy.

12. The apparatus of claim 11, wherein the fuel cell includes a solid oxide fuel cell.

13. The apparatus of claim 11, further comprising a reformer configured to receive waste heat emitted by the fuel cell, the reformer being further configured to assist in converting the jet fuel into reactants used by the fuel cell.

14. The apparatus of claim 13, wherein the reformer is one of a steam reformer, a catalytic partial oxidation reformer, or an autothermal reformer.

15. The apparatus of claim 13, further comprising a water source configured to supply water to the reformer, the reformer using water from the water source to convert the jet fuel into the reactants.

16. The apparatus of claim 13, wherein the water source includes a water separator coupled to receive exhaust gas from the turbine, the water separator being configured to extract water from the exhaust gas received from the turbine.

17. The apparatus of claim 16, wherein water produced by the water separator is used by other than the reformer.

18. The apparatus of claim 13, wherein the reactants converted from the jet fuel by the reformer include hydrogen and carbon monoxide.

19. The apparatus of claim 11, further comprising at least one heat exchanger configured to receive waste heat generated by the fuel cell and return that waste heat to the fuel cell to enhance chemical reactions taking place therein and reduce thermal gradients taking place across a fuel cell stack.

20. The apparatus of claim 11, wherein the generator further comprises a starter coupled with the drive shaft, the starter being configured such that the starter drives the compressor when the turbine is not driving the drive shaft.

21. A method for supplying electrical power, the method comprising:
    chemically converting combustible fuel into electrical energy;
    combusting uncombusted fuel emitted by the chemical conversion of combustible fuel to generate heated gas;
    using the heated gas to mechanically further compress a pressurized source of input oxidizing gas;
    using the compressed oxidizing gas to chemically convert the combustible fuel into electrical energy; and
    using the heated gas to mechanically drive a generator to produce electrical energy, wherein the source of pressurized input oxidizing gas includes cabin air from a pressurized aircraft.

22. The method of claim 21, wherein a fuel cell chemically converts the combustible fuel.

23. The method of claim 22, wherein the fuel cell includes a solid oxide fuel cell and the combustible fuel is jet fuel.

24. The method of claim 21, further comprising reforming waste heat emitted by chemically converting of the combustible fuel into reactants used in the chemically converting of the combustible fuel.

25. The method of claim 24, wherein the reforming is performed by one of a steam reformer, a catalytic partial oxidation reformer, or an autothermal reformer.

26. The method of claim 21, further comprising supplying water for use in the reforming of the waste heat.

27. The method of claim 21, wherein the supplying of water results from extracting water from the exhaust gas after the exhaust gas has been used to mechanically further compress the pressurized source of input oxidizing gas.

28. The method of claim 24, wherein the reforming results in reactants including hydrogen and carbon monoxide.

29. The method of claim 21, wherein the source of pressurized input oxidizing gas is enriched with water vapor.

30. The method of claim 21, further comprising using at least one heat exchanger to return waste heat generated by the fuel cell and to the fuel cell to enhance chemical reactions taking place therein and reduce thermal gradients taking place across a fuel cell stack.

31. The method of claim 21, further comprising using a starter motor to mechanically further compress the pressurized source of input oxidizing gas when there is no heated gas to mechanically further compress the pressurized source of input oxidizing gas.

* * * * *